United States Patent Office 2,856,171
Patented Oct. 14, 1958

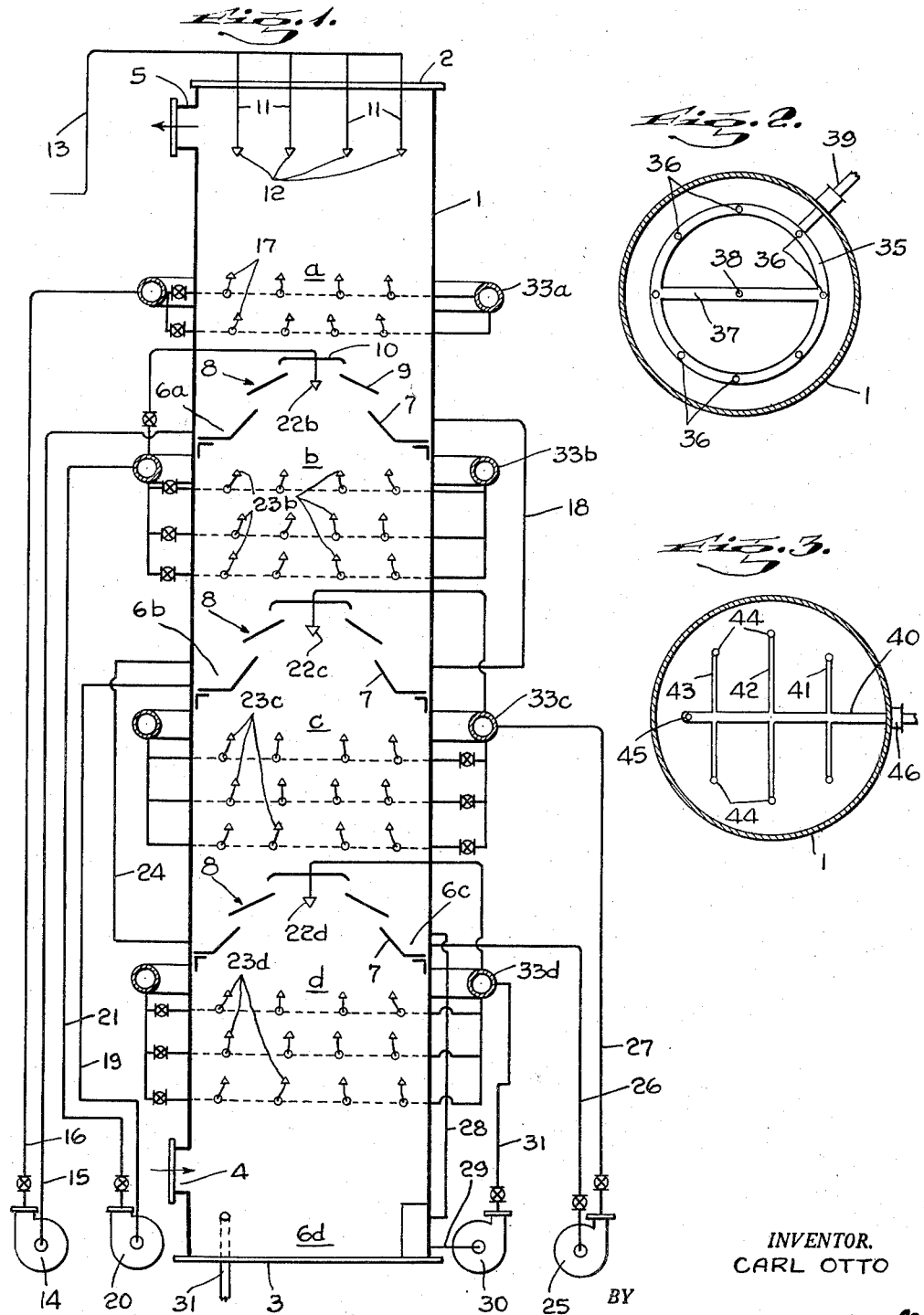

2,856,171

BENZOL SCRUBBING APPARATUS

Carl Otto, Manhasset, N. Y.

Application March 1, 1955, Serial No. 491,383

1 Claim. (Cl. 261—111)

The general object of the present invention is to provide an improved apparatus for separating vapor constituents from a gas by passing the gas through a scrubbing chamber in which the gas is brought into intimate contact with a multiplicity of finely divided particles of a suitable liquid scrubbing agent adapted to absorb said vapors.

The invention is of special utility in separating benzol or light oil vapors from distillation gas, and particularly coke oven gas, by scrubbing the gas with a vapor absorbing liquid in the general manner disclosed and claimed in my prior Patent 2,675,215, granted April 13, 1954. The separation of benzol vapors from coke oven gas presents special problems because of the large volume of gas to be scrubbed in a modern by-product coke oven benzol scrubber of customary capacity. As is fully explained hereinafter, the primary purpose and effect of the present invention is a significant increase in the ammonia absorbed per unit of time by a given volume of liquid sprayed into a scrubbing chamber of given capacity.

Prior to the invention of my above mentioned patent, benzol vapors from coke oven gas were customarily separated from coke oven gas by passing the gas upward through grid filled benzol scrubbing towers, each having a height of from 90 to 110 feet and a diameter of from 13 to 15 or 20 feet. Customarily the maximum rate at which gas was passed through such a grid filled tower was about 35 million cubic feet per 24 hours. In some such coke oven plants, gas is passed successively in one direction through two or more of such towers, while wash oil is passed downward through each tower, so that part of the benzol content of the gas stream is eliminated in each tower.

The invention disclosed and claimed in my above mentioned patent is now in extensive use and constituted a substantial improvement in the separation of benzol vapors from coke oven gas scrubbed in relatively large benzol scrubbing towers, as well as in towers of smaller size. In ordinary commercial use, each benzol scrubbing tower is adapted to pass, and to effectively scrub more than twice as much coke oven gas per day as can be adequately scrubbed in a similarly sized packed scrubbing tower of the type in general use in this country prior to the development and use of benzol scrubbers of the type disclosed in my above mentioned patent. Moreover, the increase in scrubbing capacity has been attended by a substantial decrease in the pressure drop in each tower, with a corresponding reduction in pumping cost. Furthermore, the use of the invention of Patent 2,675,215 has substantially reduced the average operating cost of benzol scrubbers, and in particular the tower cleaning costs and the risk of dangerous scrubbing tower fires occurring in cleaning such towers.

The present invention is adapted for use in the extraction from gas of vapors other than benzol vapors, such for example, as $H_2S$ and naphthalene vapors, by the respective use of a suitable caustic chemical and a suitable wash oil; and by washing gas with water or other solvents to separate ammonia therefrom. I have also discovered that the performance of the benzol scrubbers disclosed and claimed in my prior patent, may be substantially improved, and that such scrubbers may be adapted for other uses with no appreciable increase in scrubbing tower operation, construction or maintenance costs.

My present invention is primarily characterized by the novel method which I have devised for distributing and redistributing the scrubbing liquid, as the latter passes down through an associated scrubbing tower, in such manner as to minimize the tendency of the vapor elements absorbed in the descending liquid globules or droplets to concentrate in the outer portions of each such globule. In accordance with the present invention, I minimize such local concentrations by spraying scrubbing liquid droplets downward into the upper portion of each scrubbing tower or of a separate section thereof, while simultaneously spraying liquid droplets upward from a lower level or levels into contact with more or less of the descending liquid droplets. The immediate effect of each collision of an ascending liquid droplet with a descending liquid droplet may be the consolidation of the colliding droplets, or, and more usually, the shattering of all or a portion of one or both of the colliding droplets. A practically important effect of each collision is a modification of the distribution in each new or modified droplet of the absorbed particles in that droplet, and a resultant increase in the capacity of that droplet to absorb vapor particles from the gas.

Ordinarily when each such collision between an ascending and a descending liquid droplet occurs, each droplet has a higher absorbed vapor content in its outer portion than in its inner portion, and the immediate effect of the collision is a more uniform distribution of absorbed vapor particles in each of the colliding droplets. In the preferred practical form of the present invention, liquid containing absorbed vapor particles are sprayed upward in each tower section from a plurality of levels lower than the section level at which scrubbing liquid is sprayed downward in the upper portion of said section. Advantageously, liquid is sprayed upwardly in each tower section from a plurality of upwardly directed spray nozzles, and the spray nozzles at different levels may be staggered.

The various features of novelty which characterize my invention are pointed out with particularity in the claim annexed to and forming a part of this specification. For a better understanding of the invention, however, its advantages, and specific objects attained with its use, reference should be had to the accompanying drawings and descriptive matter in which I have illustrated and described preferred embodiments of the invention.

Of the drawings:

Fig. 1 is a diagrammatic illustration of a scrubbing tower for use in the practice of the present invention;

Fig. 2 is a horizontal scrubbing tower section illustrating up-spraying apparatus differing in form from that shown in Fig. 1; and Fig. 3 is a section illustrating a modification of the up-spraying apparatus shown in Fig. 2.

In the embodiment of the invention shown diagrammatically in the drawings, by way of example, use is made of a vertically elongated scrubbing tower 1 provided with transverse upper and lower end walls 2 and 3, respectively, and with a lateral gas inlet 4 adjacent its lower end and a lateral gas outlet 5 adjacent its upper end. In the particular arrangement shown in Fig. 1, the tower is divided into four superposed sections or compartments $a$, $b$, $c$ and $d$. The upper compartment $a$ is separated from the immediately subjacent compartment b by means including an annular trough 6a. The latter has an annular bottom wall portion attached to and extending horizontally inward from the wall 1, and a tapered wall 7 extending upward from the bottom wall to form a conical wall portion of the trough 6a. Liquid dropping down through the space a is deflected into the trough 6a by a louver structure 8 above and associated with the trough 6a.

As shown, the louver structure 8 comprises a lower annular member 9 and a central upper member 10. The lower member 9 has a lower outer edge above, and deflecting liquid into the trough space 7, and has its upper end extending into the space directly beneath the central upper portion 10 of the louver. The member 9 is a section of a hollow cone having its lower edge above the adjacent trough space 6a, and having its upper edge beneath and spaced away from the member 10 which is shown as comprising a conical outer portion and a flat central portion. The annular spaces between the members 7 and 9, and between the members 9 and 10, should be so formed and disposed as to pass upflowing gas from the space b into the space a with a desirably small pressure drop. As shown, a separate louver 8 is provided at the upper end of each of the sections b, c and d.

As those skilled in the art will recognize, the louver structure 8 may take various forms. Thus for example, each louver structure may include a plurality of conical sections between a center member 10 and a subjacent trough wall 7, as in the construction shown in my prior Patent 2,675,215. As shown herein, scrubbing oil is sprayed into the upper end of the chamber a through pipes 11 extending downward into the upper end of the chamber 1 through its top wall 2. Each of the pipes 11 terminates at its lower end in a nozzle 12 spraying downward into the subjacent portion of the chamber a. The straw oil or other scrubbing agent is passed to the nozzles 12 under suitable pressure through the pipes 11 from a supply pipe 13. In the desirable form of the invention illustrated, a portion of the oil passing downward through the section a and collecting in the trough 6a, is withdrawn from the latter by a pump 14 and its inlet pipe 15, and is sprayed back into the chamber a through a pipe 16 which passes the oil to upwardly directed spray nozzles 17 located in the lower portion of the chamber a.

Oil collecting in the trough 6a and not withdrawn through the pipe 15 and pump 14, overflows through a pipe 18 discharging into the trough 6b. A portion of the liquid collecting in the trough 6b is withdrawn from the latter through the inlet pipe 19 of a pump 20. The pump 20 discharges through a pipe 21 into a downwardly directed spray nozzle 22b and into a plurality of upwardly directed spray nozzles 23b. The nozzle 22b is secured to the lower end of a short depending extension of the pipe 21 which passes downward through the center of the uppermost louver element 10. As shown, there are three sets of upwardly directed nozzles 23b in the chamber b. Each set of nozzles 23b is shown as located at a level vertically displaced from the level of each of the other sets of nozzles 23b.

As shown, the tower sections b and c are separated by an annular trough 6b having a conical wall 7 associated with a corresponding louver structure 8, and the tower sections c and d are similarly separated by an annular trough 6c and corresponding louver structure 8.

Liquid collecting in the trough 6b and not withdrawn from that trough by the pump 20, passes through an overflow pipe 24 downward from the trough 6b into the trough 6c. Some of the liquid collecting in the trough 6c is withdrawn from the latter by a pump 25 through an inlet pipe 26 and is returned through a pipe 27 to spray nozzles 22c and 23c which discharge into the chamber c and may be identical in form and function with the nozzles 22b and 23b discharging into the chamber b. Liquid accumulating in the trough 6c and not withdrawn by the pump 25, overflows through a pipe 28 into the lower end portion of the chamber d, and liquid accumulating in the lower end of the chamber d is normally withdrawn from the latter through a pipe 29 by a pump 30. The pump 30 discharges liquid through the pipe 31, bus pipe 33d and the uprising nozzles 23d discharging into the chamber d at different levels, and the downwardly discharging nozzle 22d, just as liquid is discharged by the nozzles 22b and 23b and by the nozzles 22c and 23c. An overflow or waste pipe 31 leading away from a low level outlet from the tank section d, limits the accumulation of liquid in the lower portion of said section.

The discharge pipes 15, 19, 27 and 31 may discharge liquid under pressure to the respectively associated spray nozzles in various ways. Thus in Fig. 1, the spray nozzles 17 receive liquid under pressure from the outlet pipe of the pump 14 through an annular manifold or bus pipe 33a surrounding the tank 1 and connected through outlet pipes to the various spray nozzles 17. The various spray nozzles 22b and 23b discharging into the tank section b, receive liquid under pressure from a manifold or bus pipe 33b surrounding the tank 1 and receiving liquid from the outlet pipe 19 of the pump 20. Similarly, the spray nozzles discharging into the chambers c and d receive liquid under pressure from the outlet pipes 27 and 31 of the pumps 25 and 30, respectively, through corresponding manifolds 33c and 33d, in the manner in which the liquid is passed into the manifold or annular pipe 33 supplying liquid to the spray nozzles discharging into the tank section b.

It is practically feasible, however, to supply liquid to the various spray nozzles in other ways than those shown in Fig. 1. Thus, for example, the spray nozzles discharging upwardly in each of the spray chambers b, c and d shown in Fig. 1, may supply liquid to each set of nozzles at the same level through a continuous circular tube 35 within and coaxial with the tank 1, as shown in Fig. 2. The tube 35 supports a plurality of uprising nozzles 36 distributed at intervals along said tube. In Fig. 2, a branch tube 37 extends across the axis of the tank 1, and has its ends opening into diametrically opposed portions of the tube 35. The branch tube 37 minimizes pressure differences in different portions of the tube 35, and stiffens the latter. As shown, a spray nozzle 38 extends upwardly from the central portion of the pipe 37. As shown in Fig. 2, the pipe 35 is supported by a horizontal pipe 39 which extends through the wall of the tank 1 and supplies liquid directly to the tube 35 and indirectly to the tube 37 and uprising spray nozzles 36 and 38.

Fig. 3 illustrates another arrangement in which a horizontal pipe 40 extends through the tank wall at one side of the latter into proximity with the opposite side of the tank. As shown, the portion of the pipe 40 passing through the tank wall, is attached to the latter as by means of a clamping element 46. The tube 40 is shown as having horizontal arms 41, 42 and 43 extending away from opposite sides of the tube 40 and terminating at each end of each arm in an upwardly extending spray nozzle 44. As shown in Fig. 3, an uprising discharge nozzle 45 is also attached to the free end of the pipe 40. The nozzles 44 and 45 of Fig. 3 are thus arranged to spray liquid upwardly above the level of the pipes 40, 41, 42, 43 and 45 generally as liquid is sprayed upwardly through the nozzles 36 of Fig. 2.

As previously indicated, the fundamental object of the present invention is not the specific form or disposition of the spray nozzle piping, but is a spray nozzle arrangement operative to minimize the tendency of the vapor elements to concentrate in the outer portion of each individual globule. Such an accumulation of absorbed particles in the peripheral portion of each globule, tends to reduce the capacity of the globules to absorb vapor particles from the gas.

By way of illustration and example, it is noted that with a scrubbing tower 100 feet high and divided into sections similar to the sections $b$, $c$ and $d$ of Fig. 1, the upwardly discharging nozzles 23$b$, 23$c$ and 23$d$ may well have inlet ports varying in diameter from 1/8 to 3/8 of an inch, and the scrubbing liquid may well be supplied to each of said ports at a pressure of from 10 to 30 pounds per square inch.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claim and that in some cases certain features of my invention may be used to advantage without a corresponding use of other features.

Having now described my invention, what I claim as new and desire to secure by Letters Patent, is:

A scrubbing tower for separating vapors from gas by a scrubbing liquid, comprising a vertical peripherally extending wall defining a vertically extending chamber, said wall being provided with openings adjacent the bottom and top thereof to define an inlet and outlet, respectively, for the gas, a plurality of vertically spaced louver means extending across said chamber for dividing said chamber into a number of vertically stacked sections, each section being defined by two immediately adjacent louver means, each of said louver means being outwardly and downwardly directed from substantially the vertical axis of said vertically extending chamber to permit substantially unrestricted flow of gas upwardly from section to section and to substantially prevent the downward flow of said scrubbing liquid from section to section, a downwardly directed nozzle disposed adjacent the upper end of the projected volume of each of said louver means for spraying liquid downwardly into each section from the top thereof, a plurality of vertically spaced manifolds in each section, a plurality of upwardly directed nozzles operatively connected to each of said manifolds for spraying liquid upwardly in each section from the bottom thereof, said downwardly directed sprays being adapted to collide with said upwardly directed sprays.

References Cited in the file of this patent

UNITED STATES PATENTS

| | | |
|---|---|---|
| 1,073,609 | Kestner et al. | Sept. 23, 1913 |
| 1,620,826 | Mitchell | Mar. 15, 1927 |
| 1,655,171 | Wagner | Jan. 3, 1928 |
| 2,753,949 | Manuel | July 10, 1956 |

FOREIGN PATENTS

| | | |
|---|---|---|
| 17,551 | Great Britain | Sept. 18, 1893 |
| 120,304 | Great Britain | Nov. 7, 1918 |